(12) United States Patent
Maddaus

(10) Patent No.: US 8,839,663 B2
(45) Date of Patent: Sep. 23, 2014

(54) WORKING FLUID SENSOR SYSTEM FOR POWER GENERATION SYSTEM

(75) Inventor: Alan Donn Maddaus, Rexford, NY (US)

(73) Assignee: General Electric Company, Schenectady, NY (US)

(*) Notice: Subject to any disclaimer, the term of this patent is extended or adjusted under 35 U.S.C. 154(b) by 382 days.

(21) Appl. No.: 13/342,755

(22) Filed: Jan. 3, 2012

(65) Prior Publication Data
US 2013/0168971 A1    Jul. 4, 2013

(51) Int. Cl.
*G01N 25/60*    (2006.01)

(52) U.S. Cl.
USPC ........................................ 73/112.01

(58) Field of Classification Search
None
See application file for complete search history.

(56) References Cited

U.S. PATENT DOCUMENTS

| | | | |
|---|---|---|---|
| 4,149,403 A | 4/1979 | Muldary et al. | |
| 4,497,577 A | 2/1985 | Sato et al. | |
| 4,645,635 A | 2/1987 | Yuen et al. | |
| 4,679,947 A | 7/1987 | Miller et al. | |
| 4,876,897 A | 10/1989 | DeCarlo et al. | |
| 4,909,067 A | 3/1990 | Hayes | |
| 5,061,431 A | 10/1991 | Silvestri, Jr. | |
| 5,383,024 A | 1/1995 | Maxey et al. | |
| 6,643,605 B1 | 11/2003 | Endries et al. | |
| 7,013,740 B2 | 3/2006 | Dutton et al. | |
| 7,231,835 B2 | 6/2007 | Dutton et al. | |
| 2007/0163264 A1* | 7/2007 | Diaz et al. | 60/775 |
| 2008/0178659 A1* | 7/2008 | Spinelli et al. | 73/29.01 |

FOREIGN PATENT DOCUMENTS

JP    06299870    * 10/1994

* cited by examiner

*Primary Examiner* — Robert R Raevis
(74) *Attorney, Agent, or Firm* — Ernest G. Cusick; Hoffman Warnick LLC

(57) ABSTRACT

A working fluid sensor system adapted to analyze operation of a power generation system is disclosed. In one embodiment, a working fluid sensor system includes: a set of sensors adapted to be disposed within a turbine, the set of sensors including probe portions which extend into a flowpath of the turbine for exposure to a working fluid, the probe portions adapted to react to a force exerted by the working fluid on the probe portions and indicate a moisture content of the working fluid.

9 Claims, 10 Drawing Sheets

WORKING FLUID SENSOR SYSTEM FOR POWER GENERATION SYSTEM

BACKGROUND OF THE INVENTION

The subject matter disclosed herein relates to power plant systems and, more particularly, to working fluid sensor systems for analyzing the operation, performance, and/or efficiency of turbines and power generation systems.

Some power plant systems, for example certain nuclear, simple-cycle and combined-cycle power plant systems, employ turbines in their design and operation. Analysis of the operation and performance of some of these systems and turbines (e.g., steam turbines, low pressure steam turbines, etc.) may be assisted and/or performed by analyzing a moisture content of a working fluid (e.g., exhaust steam) in the turbine. This analysis may enable technicians and/or designers to make more informed decisions with regard to maintenance, design adjustments and plant operations (e.g., which turbines to operate when, whether operational parameters need to be adjusted for a particular turbine, whether maintenance needs to be performed for a particular turbine, etc.). In systems incorporating a Low Pressure (LP) steam turbine the measured moisture content of the LP turbine exhaust steam may be used along with data on the LP turbine exhaust pressure, LP turbine inlet pressure and LP turbine operating temperatures, to calculate the LP turbine efficiency. Therefore, it is desirable to quickly, accurately and reliably measure the moisture content within the turbine, particularly in the turbine exhaust. Some power plant systems rely on extracting and analyzing exhaust steam samples to determine a moisture content of the working fluid in the turbine. Other systems have attempted to employ optical sensors using light extinction theory to determine a moisture content of the exhaust steam. However, samples may be difficult to obtain and test, and installing, calibrating and operating optical sensors may not be economically possible or efficient. Thus, these systems may be imprecise, time consuming, technically complicated and/or not feasible.

BRIEF DESCRIPTION OF THE INVENTION

Systems for analyzing operation of a power generation system are disclosed. In one embodiment, a working fluid sensor system includes: a set of sensors adapted to be disposed within a turbine, the set of sensors including probe portions which extend into a flowpath of the turbine for exposure to a working fluid, the probe portions adapted to react to a force exerted by the working fluid on the probe portions and indicate a moisture content of the working fluid.

A first aspect of the invention provides a system including: a set of sensors adapted to be disposed within a turbine, the set of sensors including probe portions which extend into a flowpath of the turbine for exposure to a working fluid, the probe portions adapted to react to a force exerted by the working fluid on the probe portions and indicate a moisture content of the working fluid.

A second aspect of the invention provides a system including: at least one computing device adapted to determine an operational characteristic of a turbine by performing actions comprising: obtaining flow data from a set of sensors exposed to a flow of a working fluid in the turbine, the flow data including at least one of: a drag coefficient on the set of sensors, a set of current ambient conditions at the turbine, or an erosive effect of the working fluid on the set of sensors; determining a moisture content of the working fluid based upon the flow data; and determining an operational characteristic for the turbine based on the moisture content of the working fluid.

A third aspect of the invention provides a combined cycle power generation system including: a gas turbine; a heat recovery steam generator (HRSG) operatively connected to the gas turbine; a steam turbine operatively connected to the HRSG; a generator operatively connected to at least one of the gas turbine or the steam turbine; and a set of sensors adapted to be disposed within the steam turbine, the set of sensors including probe portions which extend into a flowpath of the steam turbine for exposure to a working fluid, the probe portions adapted to react to a force exerted by the working fluid on the probe portions and indicate a moisture content of the working fluid.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
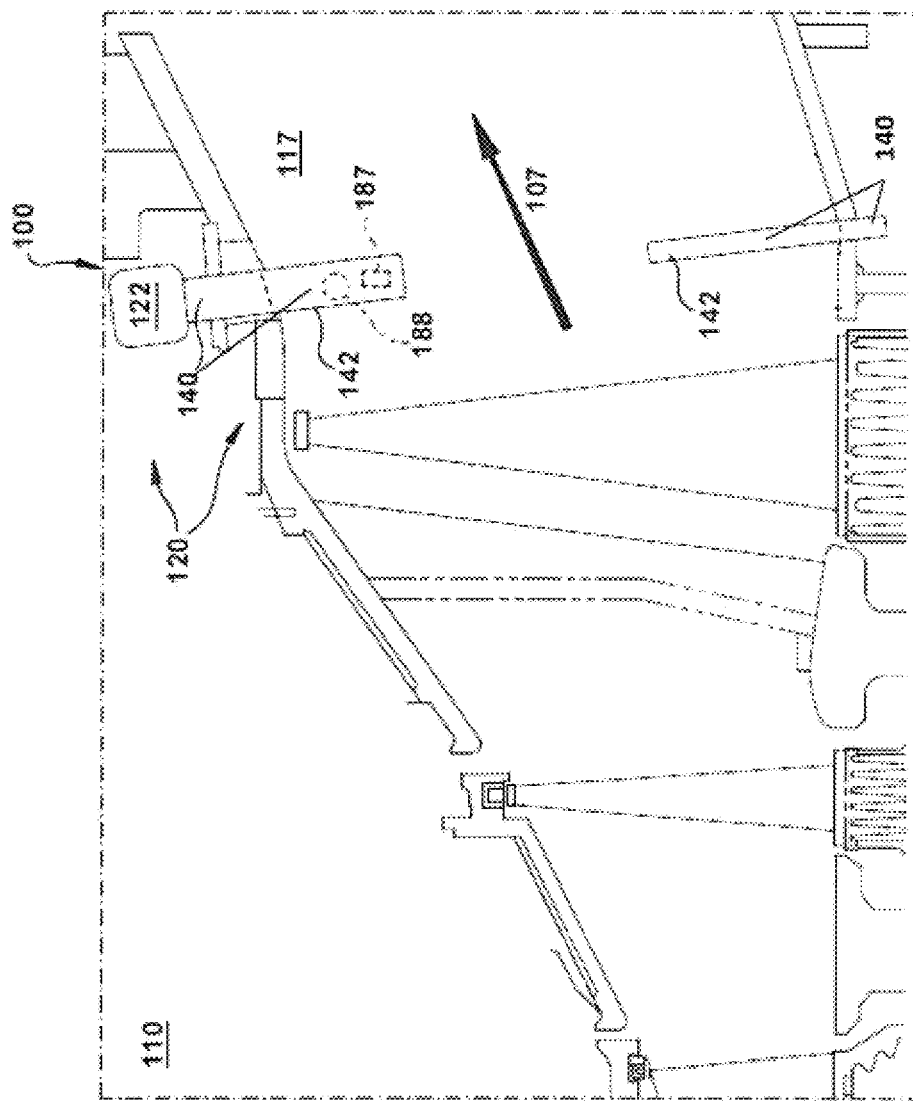
FIG. 1 shows a schematic cut-away view of portions of a steam turbine in accordance with an embodiment of the invention.

It is noted that the drawings of the disclosure may not necessarily be to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated herein, aspects of the invention provide for systems configured to analyze operation of a turbine by obtaining and processing a flow data set (e.g., a drag coefficient on a set of sensors, a temperature of a working fluid, a set of current ambient conditions at the turbine, an erosive effect of the working fluid on the set of sensors, moisture content values, etc.) for a working fluid (e.g., steam) in the turbine. These systems include a set of sensors disposed in a flowpath of the turbine so as to interact with a working fluid and obtain data flow values for the flow data set (e.g., a drag coefficient on a set of sensors, a temperature of a working fluid, a set of current ambient conditions at the turbine, an erosive effect of the working fluid on the set of sensors, moisture content values, etc.), these values then being analyzed to evaluate turbine operations.

Design and operation of some power generation systems (including, e.g., steam turbines, gas turbines, etc.), may include component maintenance and/or regulation and incremental adjustment of a number of operating parameters. Adjustment of operational parameters and/or performance of maintenance operations may be governed by an efficiency of the system and/or components (e.g., turbines within the system). A moisture content measurement of a working fluid in a given turbine may enable a direct, real-time determination of the efficiency/performance characteristics of the turbine. However, current systems do not have a quick, routine, and/or accurate way to measure moisture content in the turbine. This lack of accurate and reliable moisture content measurement and turbine efficiency analysis; may result in non-optimized designs, delayed and improper maintenance operations and a decreased efficiency of the system.

In contrast to the conventional system, embodiments of the current invention provide for a system which accurately and reliably analyzes turbine operation. The system extends a set of sensors into the flowpath of a working fluid in the turbine, thereby directly exposing the set of sensors to the working fluid and causing the set of sensors to react to the working fluid. The reaction (e.g., surface erosion, drag coefficient, etc.) of the set of sensors generates a flow data set for the turbine in a given operational range (e.g., at a specific speed, at a specific load characteristic, in a specific state, etc.). Analysis of the flow data set determines a moisture content of the working fluid and the related turbine performance levels.

As will be appreciated by one skilled in the art, the system described herein may be embodied as a system(s), method(s), operator display (s) or computer program product(s), e.g., as part of a power plant system, a power generation system, a turbine system, etc. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning to the FIGURES, embodiments of a system configured to analyze the operation, performance, and/or efficiency of turbines and power generation systems by generating and analyzing a flow data set is disclosed. Each of the components in the FIGURES may be connected via hard-wired, wireless, or other conventional means as is indicated in FIGS. 1-10. Specifically, referring to FIG. 1, an illustrative environment 100 including portions of a turbine 110 (e.g., a steam turbine) is shown according to embodiments of the invention. Turbine 110 may include a working fluid sensor system 120 which is communicatively connected to a flowpath 117 in turbine 110. Working fluid sensor system 120 may include a computing device 122 connected to a set of sensors 140 disposed within flowpath 117. Set of sensors 140 include a probe portion 142 which is exposed to/interacts with a working fluid 107 in flowpath 117. Computing device 122 is configured to monitor and/or analyze the interaction between working fluid 107 and set of sensors 140, and generate a flow data set based on this interaction.

In an embodiment of the present invention, set of sensors 140 may include any number or combination of probe portions 142 (e.g., circular cylinders, airfoils, etc.) connected to turbine 110 and adapted to extend into/obstruct a portion of flowpath 117. These probe portions 142 may be adapted to be extendable and removable from flowpath 117 and to contact working fluid 107 during operation of turbine 110. In one embodiment, probe portions 142 may be inserted into flowpath 117 once operation of turbine 110 has been stabilized at a design point condition (e.g., a specific load, a specific speed, etc.). The reaction (e.g., erosion, displacement, etc.) of probe portions 142 to exposure to and/or a force exerted by working fluid 107 may be used to develop the flow data set and/or determine a moisture content of working fluid 107.

In one embodiment, probe portions 142 may be exposed to working fluid 107 for a pre-determined period of time and then removed and analyzed to develop the flow data set and determine the flow characteristics of working fluid 107 and/or the operational characteristics (e.g., moisture content of working fluid 107, operating condition of turbine 110, performance of turbine 110, etc.) of turbine 110. In one embodiment, contact between working fluid 107 and set of sensors 140 may erode probe portions 142. In one embodiment, set of sensors 140 may be weighed before and after exposure to working fluid 107, the difference in weights of set of sensors 140 before exposure to working fluid 107 and after exposure to working fluid 107 determining an erosion rate of probe portions 142. The determined erosion rate may then be used to calculate and/or determine a moisture content of working fluid 107. In another embodiment, a roughness determination (e.g., a determination of the texture/surface roughness) of probe portions 142 may be made after exposure to working fluid 107. The roughness determination may then be compared to a known roughness for probe portions 142 from before exposure to working fluid 107 to determine an erosion rate of probe portions 142, and thus, determine the related moisture content of working fluid 107. In one embodiment, set of sensors 140 may include sacrificial probes/specimens. In another embodiment, set of sensors 140 may include a sacrificial/erosive coating disposed about at least a portion of set of sensors 140. In one embodiment, the erosive coating may have a low erosion resistance. In another embodiment, set of sensors 140 may include an erosive sheath disposed about at least a portion of sensors 140. In one embodiment, the erosive sheath may have a low erosion resistance.

In another embodiment, set of sensors 140 may be adapted to determine a set of drag values (e.g., drag coefficients) on probe portions 142 exerted by flow of working fluid 107. In one embodiment, computing device 122 may determine a moisture content of working fluid 107 based on the drag coefficients determined by set of sensors 140. In one embodiment, set of sensors 140 may include a thermometer and a set of pressure transducers 187 (shown in phantom), and computing device 122 may include a load cell. Computing device 122 may process data obtained from the thermometer, set of pressure transducers 187 and the load cell to determine the drag coefficients for probe portions 142. In one embodiment, a plurality of pressure transducers 187 may be disposed about a midspan of probe portions 142. In one embodiment, set of pressure transducers 187 may be disposed within probe portions 142 and exposed to working fluid 107 via a set of ports 188 (shown in phantom) formed in probe portions 142. In one embodiment, computing device 122 may determine a moisture content of working fluid 107 based on the differences in drag coefficient determined between each probe portion 142 in set of sensors 140. In one embodiment, probe portions 142 may have varying shapes relative one another. In another embodiment, computing device 122 may determine a moisture content of working fluid 107 based on an average of the drag coefficients determined by set of sensors 140. In one embodiment, computing device 122 may be located external to turbine 110. In one embodiment, computing device 122 may be remotely located (e.g., in a separate portion of a power generation plant, at a different geographical location, etc.) relative to a position of turbine 110. In another embodiment, computing device 122 may be an internal component of turbine 110. It is understood that set of sensors 140 may include any now known or later developed sensing device, including a combination of sensor devices, transducers, thermometers, etc. disposed throughout turbine 110.

Figure 2:
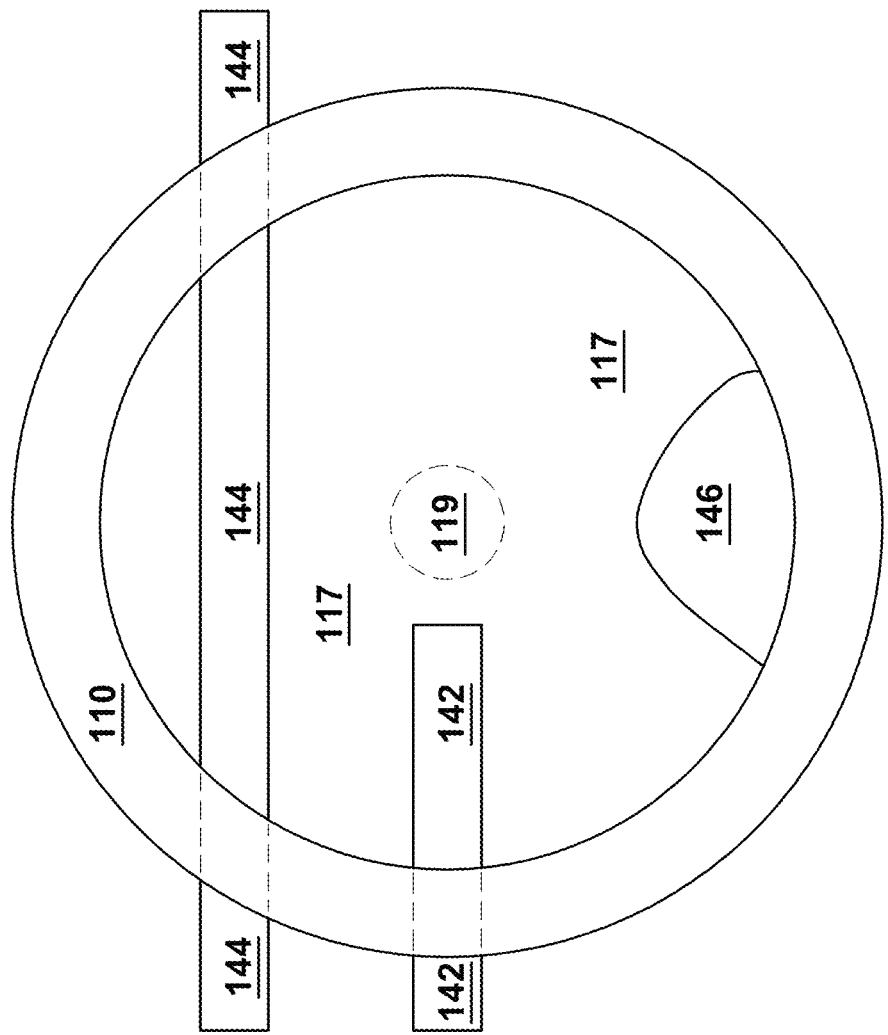
FIG. 2 shows a schematic cut-away view of portions of a steam turbine in accordance with an embodiment of the invention.

Turning to FIG. 2, a schematic partial cut-away view of portions of turbine 110 is shown defining a flowpath 117 according to embodiments. It is understood that elements similarly numbered between FIG. 1 and FIG. 2 may be substantially similar as described with reference to FIG. 1. Further, in embodiments shown and described with reference to FIGS. 2-10, like numbering may represent like elements. Redundant explanation of these elements has been omitted for clarity. Finally, it is understood that the components of FIGS. 1-10 and their accompanying descriptions may be applied to any embodiment described herein.

Returning to FIG. 2, in this embodiment, turbine 110 may include a first probe sensor 142, a second probe sensor 144, and a scoop sensor 146 connected to portions of turbine 110 and in contact with a portion of flowpath 117. First probe sensor 142 is connected to a portion of turbine 110 and extends partially into flowpath 117. In one embodiment, first probe sensor 142 may include an airfoil shape. In another embodiment, first probe sensor 142 may include a cylindrical shape. Second probe sensor 144 is connected to multiple portions of turbine 110 and traverses/extends through a portion of flowpath 117 above a rotor 119. In one embodiment, second probe sensor 144 dissects flowpath 117 into separate portions. Scoop sensor 146 extends into a portion of flowpath 117 and has a cup or scoop like shape. In one embodiment, scoop sensor 146 is adapted to capture a portion of working fluid 107 during operation of turbine 110. It is understood that any of first probe sensor 142, second probe sensor 144, scoop sensor 146 and/or set of sensors 140, may be attached to turbine 110 via any now know or later developed methods. In one embodiment, a set of apertures may be formed in turbine 110 to enable insertion, extraction, and/or securing of first probe sensor 142, second probe sensor 144, scoop sensor 146 and/or set of sensors 140 in flowpath 117.

Figure 3:
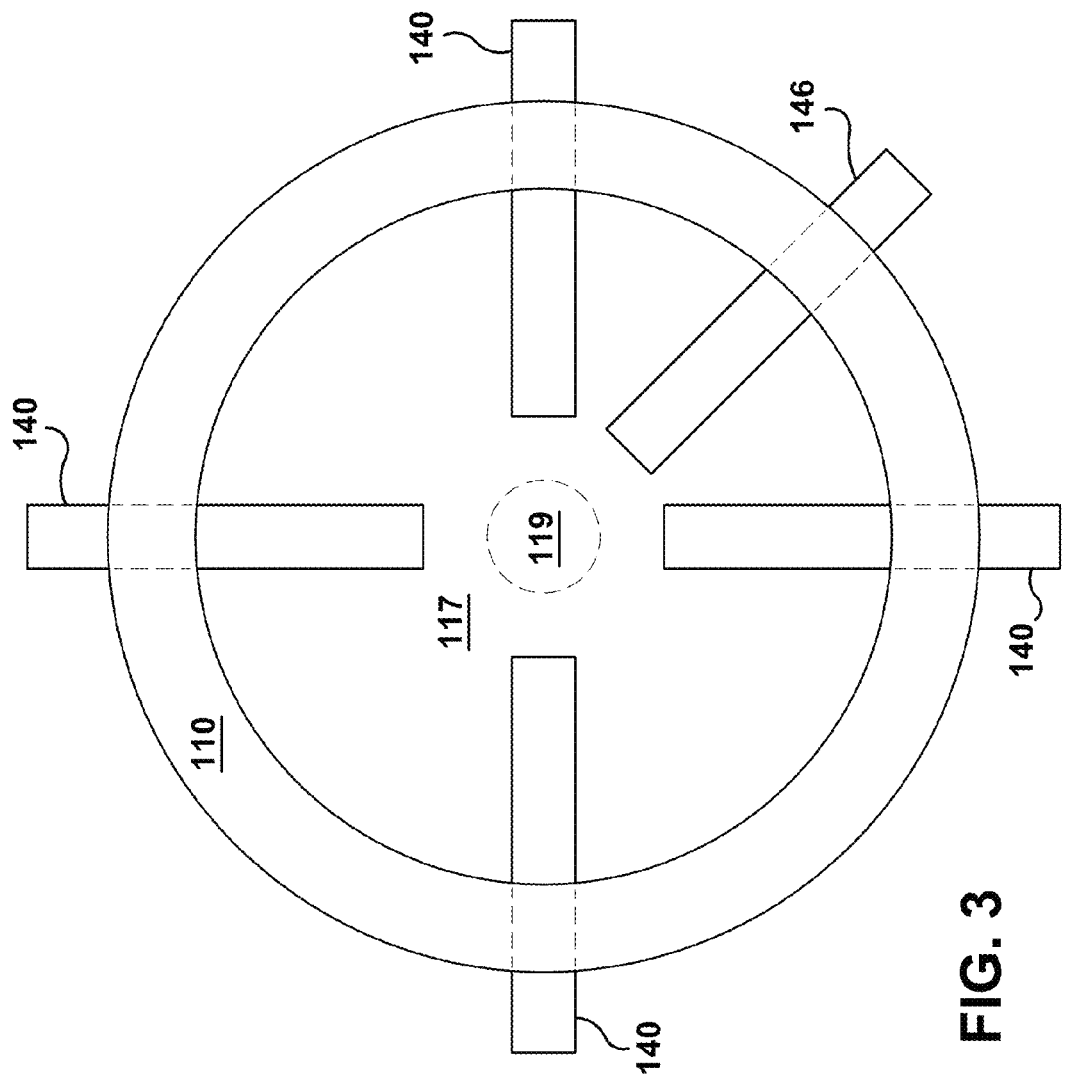
FIG. 3 shows a schematic cut-away view of portions of a steam turbine in accordance with an embodiment of the invention.

Turning to FIG. 3, a schematic partial cut-away view of portions of turbine 110 is shown defining a flowpath 117 according to embodiments. In this embodiment, set of sensors 140 include a plurality of sensors spaced about turbine 110 and extending into flowpath 117. In one embodiment, set of sensors 140 include four sensors spaced circumferentially about flowpath 117. In one embodiment, set of sensors 140 are spaced about equidistant about a circumference of flowpath 117. In another embodiment, set of sensors 140 may be adapted to complement a low pressure diagnostic test approach with traverse probes and rakes, this set of sensors attaching to and or installing within existing apertures, brackets, and/or other hardware designed to secure testing components. It is understood that while set of sensors 140, first probe sensor 142, second probe sensor 144, and scoop sensor 146 are shown disposed within flowpath 117 at specific angles, these sensors may be disposed at any angle, configuration, or orientation within turbine 110 and/or flowpath 117. Further, set of sensors 140 may include any number or combination of first probe sensor 142, second probe sensor 144, scoop sensor 146, or any other sensor or sensor shape now known or later developed.

Figure 4:
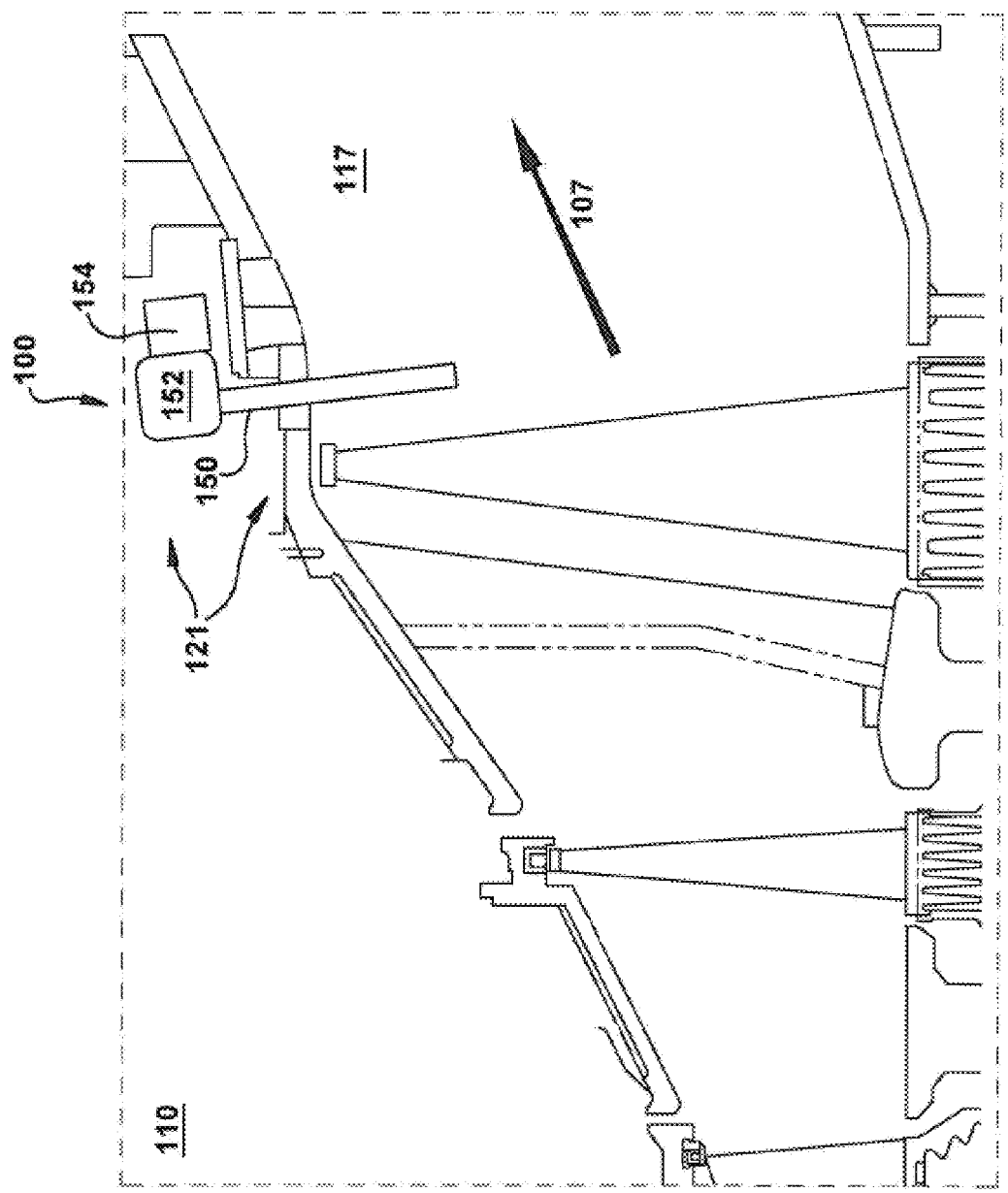
FIG. 4 shows a schematic cut-away view of portions of a steam turbine in accordance with an embodiment of the invention.

Turning to FIG. 4, a schematic partial cut-away view of portions of turbine 110 is shown including a working fluid sensor system 121 according to embodiments. In this embodiment working fluid sensor system 121 includes a support bracket 154 which is connected to turbine 110 and is adapted to support a load cell 152 connected to a probe sensor 150. In one embodiment, probe sensor 150 is exposed to a working fluid 107 by extension into a flowpath 117 defined by turbine 110. As working fluid 107 moves through flowpath 117 it exerts a force on probe sensor 150 which may be measured by load cell 152. In one embodiment, load cell 152 may calculate a drag coefficient on probe sensor 150 based on the measured force. In another embodiment, load cell 152 may transmit the force measurement to computing device 122 (shown in FIG. 7) which may process the measured force to determine a drag coefficient on probe sensor 150, a related moisture content of working fluid 107 and/or any number of operational characteristics of turbine 110. In one embodiment, computing device 122 may determine an efficiency and/or at least one operational characteristic of turbine 110 based on the drag coefficient of probe sensor 150.

Figure 5:
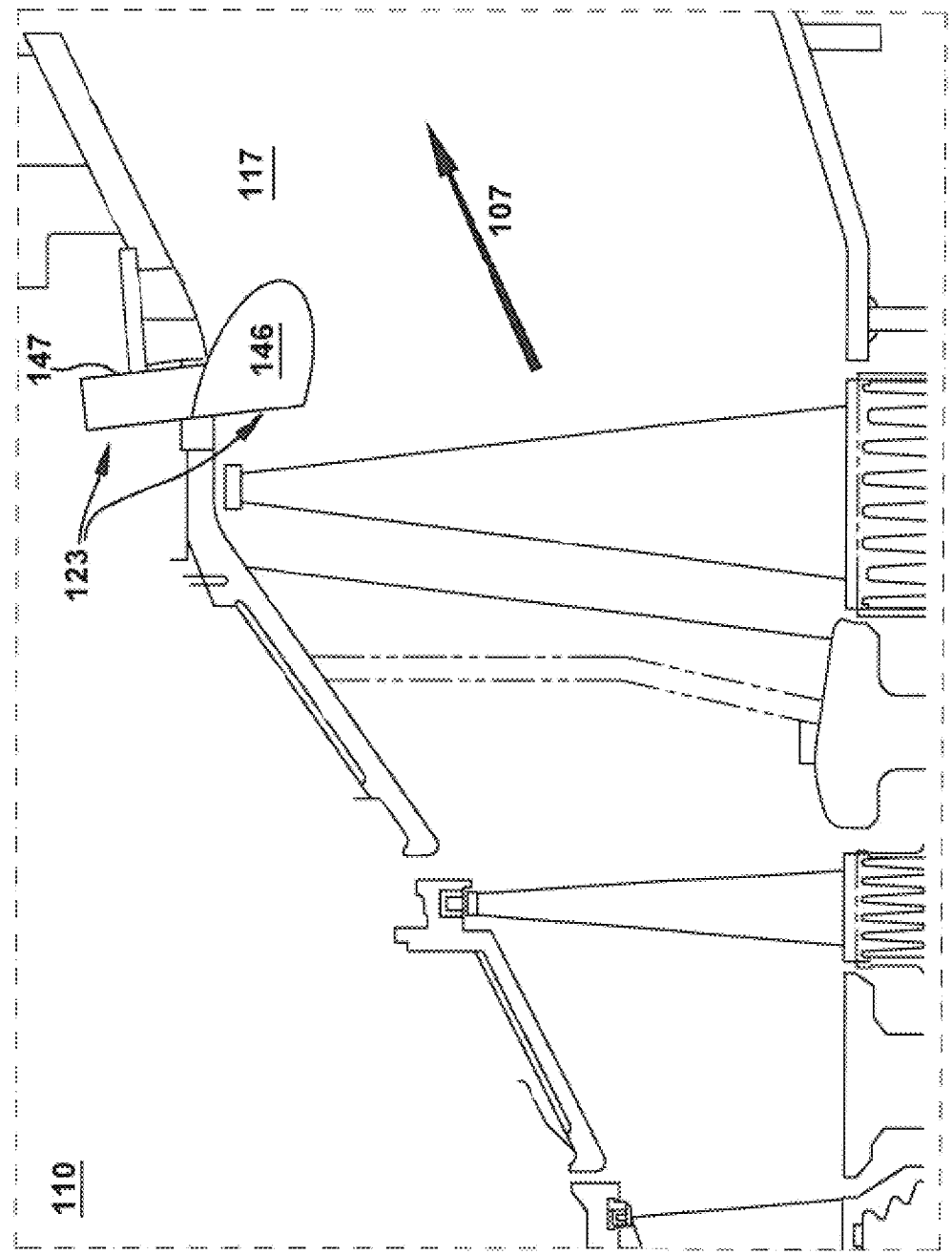
FIG. 5 shows a schematic cut-away view of portions of a steam turbine in accordance with an embodiment of the invention.

Turning to FIG. 5, a schematic partial cut-away view of portions of turbine 110 is shown including a working fluid sensor system 123 according to embodiments. In this embodiment working fluid sensor system 123 includes a scoop sensor 146 which is connected to turbine 110 via a scoop sensor base system 147. In one embodiment, scoop sensor 146 is extended into a flowpath 117 defined by turbine 110 and exposed to a working fluid 107. As working fluid 107 moves through flowpath 117 it exerts a force on scoop sensor 146 which may be measured and/or analyzed by scoop sensor base system 147. In one embodiment, scoop sensor 146 may capture an amount of water in working fluid 107 and convey the captured water to scoop sensor base system 147 for quantification and/or further analysis. In one embodiment, scoop sensor base system 147 may determine a moisture content of working fluid 107 based on the amount of water captured by scoop sensor 146 and the duration of time that scoop sensor 146 is exposed to working fluid 107. In another embodiment, scoop sensor base system 147 may transmit a measurement of the amount of water captured by scoop sensor 146 to computing device 122 (shown in FIG. 7) which may process the measurement to determine a moisture content of working fluid 107. In another embodiment, scoop sensor base system 147 may calculate a drag coefficient on scoop sensor 146 based on the measured force. In another embodiment, scoop sensor base system 147 may transmit the force measurement to computing device 122 (shown in FIG. 7) which may process the measured force to determine a drag coefficient on scoop sensor 146, a related moisture content of working fluid 107 and/or any number of operational characteristics of turbine 110.

Figure 6:
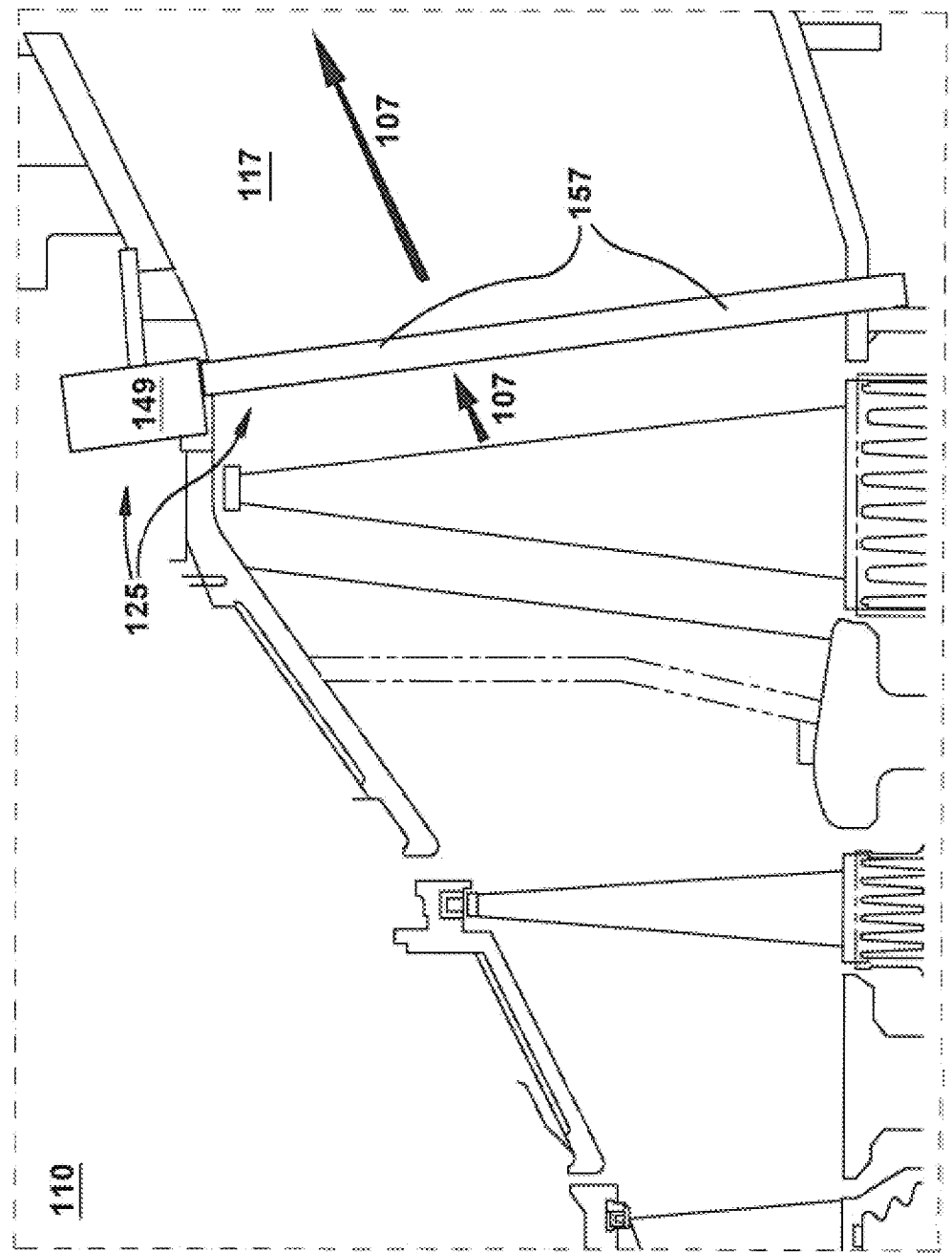
FIG. 6 shows a schematic cut-away view of portions of a steam turbine in accordance with an embodiment of the invention.

Turning to FIG. 6, a schematic partial cut-away view of portions of turbine 110 is shown including a working fluid sensor system 125 according to embodiments. In this embodiment working fluid sensor system 125 includes a base bracket 149 which is connected to turbine 110 and is adapted to support a transverse probe sensor 157. In one embodiment, transverse probe sensor 157 is extended into flowpath 117 and exposed to working fluid 107. As working fluid 107 moves through flowpath 117 it exerts a force on transverse probe sensor 157 which erodes a surface of transverse probe sensor 157. In one embodiment, transverse probe sensor 157 may traverse flowpath 117. In one embodiment, base bracket 149 is adapted to secure transverse probe sensor 157 to turbine 110.

In an embodiment, base bracket 149 may be operable by a technician, thereby enabling insertion and extraction from flowpath 117. In one embodiment, a technician may insert transverse probe sensor 157 into flowpath 117 for a predetermined period of time, then the technician may extract transverse probe sensor 157 for inspection. In one embodiment, the technician may weigh transverse probe sensor 157 after exposure to working fluid 107 and compare this weight to a known weight of transverse probe sensor 157 prior to exposure to working fluid 107. The technician may then determine an erosion rate of transverse probe sensor 157 and a related moisture content of working fluid 107 based on the difference between the weights of transverse probe sensor 157 before and after exposure. In another embodiment, the technician may determine a surface condition (e.g., roughness) of transverse probe sensor 157 after exposure to working fluid 107 and compare this surface condition to a known surface condition of transverse probe sensor 157 prior to exposure to working fluid 107. The technician may then use the difference between the surface conditions to determine an erosion rate of transverse probe sensor 157 and a related moisture content of working fluid 107. In one embodiment, the technician may determine a moisture content of working fluid 107 and/or efficiency of turbine 110 based on an erosion rate or surface roughness increase on transverse probe sensor 157 over time. In one embodiment, the technician may correlate/compare a measured erosion rate or surface roughness increase value to a set of erosion rates or surface roughness increase values which have been developed in a laboratory test facility. The developed values, being obtained from a set of tests performed in a controlled environment on a comparable probe sensor. In one embodiment, a calibration could be developed by use of LP turbine efficiency from a standard code test. It is understood that computing device 122 may perform any of the analysis performed by the technician. Further, computing device 122 may be used to automate the use of transverse probe sensor 157, including extraction and insertion.

Figure 7:
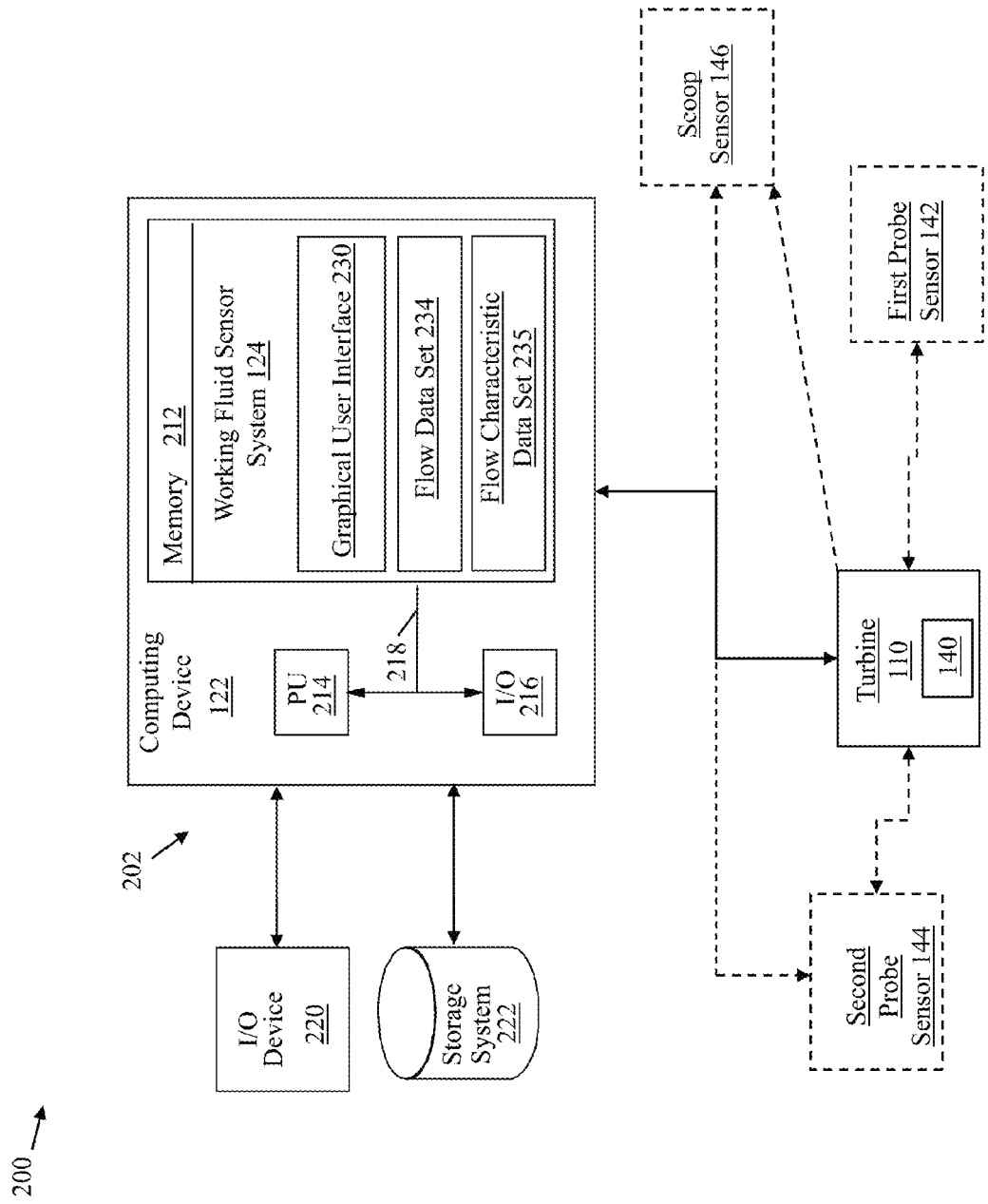
FIG. 7 shows a schematic illustration of an environment including a system in accordance with an embodiment of the invention.

Turning to FIG. 7, an illustrative environment 200 including a working fluid sensor system 124 is shown according to embodiments of the invention. Environment 200 includes a computer infrastructure 202 that can perform the various processes described herein. In particular, computer infrastructure 202 is shown including computing device 122 which includes working fluid sensor system 124, which enables computing device 122 to analyze operation of a turbine 110 by performing the process steps of the disclosure. In one embodiment, computing device 122 may determine an efficiency and/or at least one operational characteristic of turbine 110 based on a drag coefficient for set of sensors 140. The computer software may include steam properties routines to enable calculation of the required thermodynamic variable necessary for LP turbine efficiency calculations.

As previously mentioned and discussed further below, working fluid sensor system 124 has the technical effect of enabling computing device 122 to perform, among other things, the operational/working fluid analysis described herein. It is understood that some of the various components shown in FIG. 7 can be implemented independently, combined, and/or stored in memory for one or more separate computing devices that are included in computing device 122. Further, it is understood that some of the components and/or functionality may not be implemented, or additional schemas and/or functionality may be included as part of working fluid sensor system 124.

Computing device 122 is shown including a memory 212, a processor unit (PU) 214, an input/output (I/O) interface 216, and a bus 218. Further, computing device 122 is shown in communication with an external I/O device/resource 220 and a storage system 222. As is known in the art, in general, PU 214 executes computer program code, such as working fluid sensor system 124, that is stored in memory 212 and/or storage system 222. While executing computer program code, PU 214 can read and/or write data, such as graphical user interface 230 and/or operational data 234, to/from memory 212, storage system 222, and/or I/O interface 216. Bus 218 provides a communications link between each of the components in computing device 122. I/O device 220 can comprise any device that enables a user to interact with computing device 122 or any device that enables computing device 122 to communicate with one or more other computing devices. Input/output devices (including but not limited to keyboards, displays, pointing devices, etc.) can be coupled to the system either directly or through intervening I/O controllers.

In some embodiments, as shown in FIG. 7, environment 200 may optionally include a first probe sensor 242, a second probe sensor 244 and a scoop sensor 246 communicatively connected to turbine 110 and computing device 122 (e.g., via wireless or hard-wired means). First probe sensor 242, second probe sensor 244 and scoop sensor 246 may include any number of sensors as is known, including a thermometer, a humidity sensing device, gas turbine instruments, steam turbine instruments, etc. In some embodiments, computing device 122 and/or working fluid sensor system 124 may be disposed upon or within turbine 110.

In any event, computing device 122 can comprise any general purpose computing article of manufacture capable of executing computer program code installed by a user (e.g., a personal computer, server, handheld device, etc.). However, it is understood that computing device 122 is only representative of various possible equivalent computing devices and/or technicians that may perform the various process steps of the disclosure. To this extent, in other embodiments, computing device 122 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 122 may be/include a distributed control system. In another embodiment, computing device 122 may be integral to a gas turbine. In another embodiment, computing device 122 may be integral to a steam turbine. In another embodiment, computing device 122 may be a part of power generation system 140. In one embodiment, computing device 122 may include a MARK VI controller. In another embodiment, computing device 122 may include a monitoring unit located proximate turbine 110 and a processing unit located remote to turbine 110.

Figure 8:
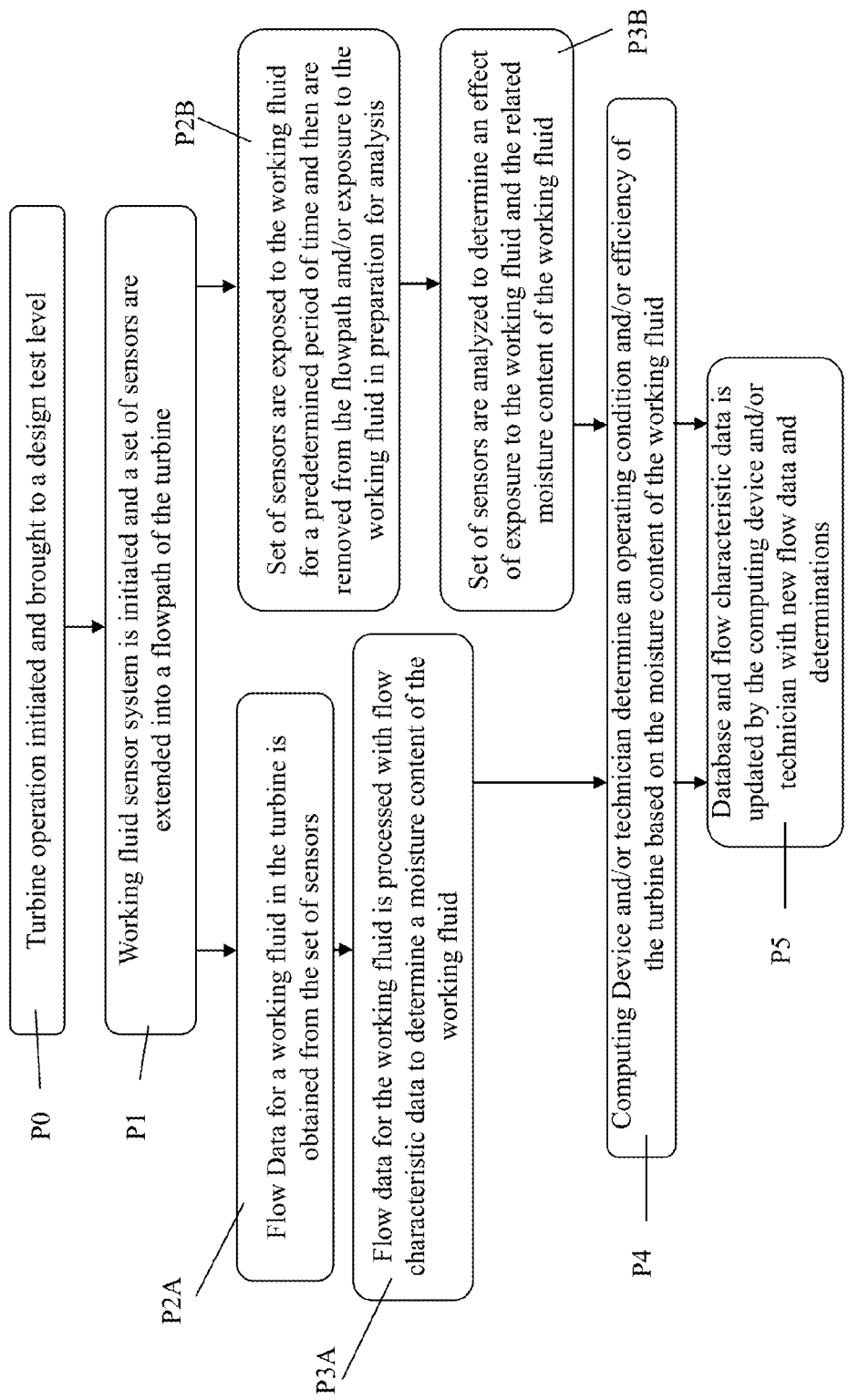
FIG. 8 shows a method flow diagram illustrating a process according to embodiments of the invention.

Turning to FIG. 8, an illustrative method flow diagram is shown according to embodiments of the invention: In pre-process P0, operation of turbine 110 is initiated and brought to a test level (e.g., a speed, a specific load, a set of specified operational parameters, etc.) for analysis by working fluid sensor system 124 and/or computing device 122. That is, the operational parameters of turbine 110 may be selected from various steam temperatures, loads, or other operating parameter ranges and confined to steady operation within the selected ranges. The range of the selected turbine 110 operating condition(s) including but not necessarily limited to the designed optimal operational condition for turbine 110. In one embodiment, the operational parameters of turbine 110 may be stabilized. In another embodiment, the operational parameters of turbine 110 may be set to a base level and then varied during analysis. This testing process may be either an automatic/scheduled analysis of turbine 110, a condition dictated analysis of turbine 110 or a manual/user-commanded analysis of turbine 110. Following pre-process P0, in process P1, working fluid sensor system 124 is initiated and probe portions 142 of a set of sensors 140 are extended into a flowpath 117 in turbine 110. Extension and/or insertion into turbine 110 causes probe portions 142 to contact and react to working fluid 107 which is driven through flowpath 117 by operation of turbine 110. Following process P1, in process P2A, a technician and/or computing device 122 obtains a set of flow data for working fluid 107. Flow data may be obtained from at least one of: memory 212, storage system 222, and/or set of sensors 140. Flow data may include a temperature of working fluid 107, a pressure of working fluid 107, an erosion rate of probe portions 142, a drag coefficient for probe portions 142 in working fluid 107, etc. In one embodiment, set of sensors 140 may be connected to a load cell 152 which obtains real-time and/or updated data values for working fluid 107. Following process P2A, in process P3A, the technician and/or computing device 122 accesses flow characteristic data 235 (e.g. a look-up table, a pre-generated curve of known drag coefficients for set of sensors 140, steam turbine design basis, etc.), to determine the moisture content of working fluid 107 based upon flow data 234 obtained from turbine 110 via set of sensors 140. In one embodiment, flow characteristic data 235 may be developed in an operating laboratory test turbine under controlled conditions to develop a comparable set of flow characteristic data 235 which may be correlated with obtained flow data 234. In one embodiment, the moisture content of working fluid 107 may be determined by considering the drag coefficient of probe portions 142 to be a function of moisture content.

In one embodiment, the technician, computing device 122 and/or PU 214 may access any of: a drag coefficient look-up table, a pre-generated drag coefficient curve and/or stored drag coefficient data. The technician, computing device 122 and/or PU 214 may compare flow data set 234 to data points in any of the drag coefficient look-up table, the pre-generated drag coefficient curve and/or the stored drag coefficient data to determine a moisture content of working fluid 107. Following process P3A, in process P4, the technician, computing device 122 and/or PU 214 may determine an operating condition and/or efficiency of turbine 110 based on the determined moisture content of working fluid 107.

Alternatively, in process P2B, probe portions 142 are left extended in flowpath 117 during operation of turbine 110 for a predetermined period of time (e.g., several minutes, hours, days, etc.). After probe portions 142 have been exposed for the predetermined period of time, probe portions 142 are withdrawn from flowpath 117. Withdrawal of probe portions 142 may be automated or manually performed by a technician. Further, probe portions 142 may be withdrawn simultaneously or individually. In one embodiment, each probe portion 142 in set of sensors 140 may be withdrawn incrementally over varying time periods. In any event, following process P2B, in process P3B, set of sensors 140 are analyzed to determine an effect of exposure to working fluid 107. In one embodiment, set of sensors 140 may be weighed after being withdrawn, this weight being compared to a known weight of set of sensors 140 prior to exposure to working fluid 107 to determine an amount of erosive loss suffered by set of sensors 140. This amount of erosive loss is then used to determine a related moisture content of working fluid 107. In another embodiment, a surface roughness of probe portions 142 may be determined after being withdrawn. This surface roughness is compared to a known surface roughness for probe portions 142 prior to exposure to working fluid 107 to determine the erosive impact working fluid 107 had on probe portions 142. The determined erosive impact is then used to determine a related moisture content of working fluid 107. Following process P3B, in process P4, the technician, computing device 122 and/or PU 214 may determine an operating condition and/or efficiency of turbine 110 based on the determined moisture content of working fluid 107.

Following process P4, in process P5, the technician, computing device 122 and/or PU 214 updates any of memory 212, storage system 222 and/or flow characteristic data set 235 based upon readings from set of sensors 140. In one embodiment, these real-time readings are used to update flow data set 234, calibrate prediction software, adjust operating conditions and/or turbine design specifications. These readings are saved in any of memory 212 and storage system 222 to enhance flow data analysis and turbine operation predictions by computing device 122. In one embodiment, these readings are factored into the analysis by computing device 122.

The data flow diagram and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
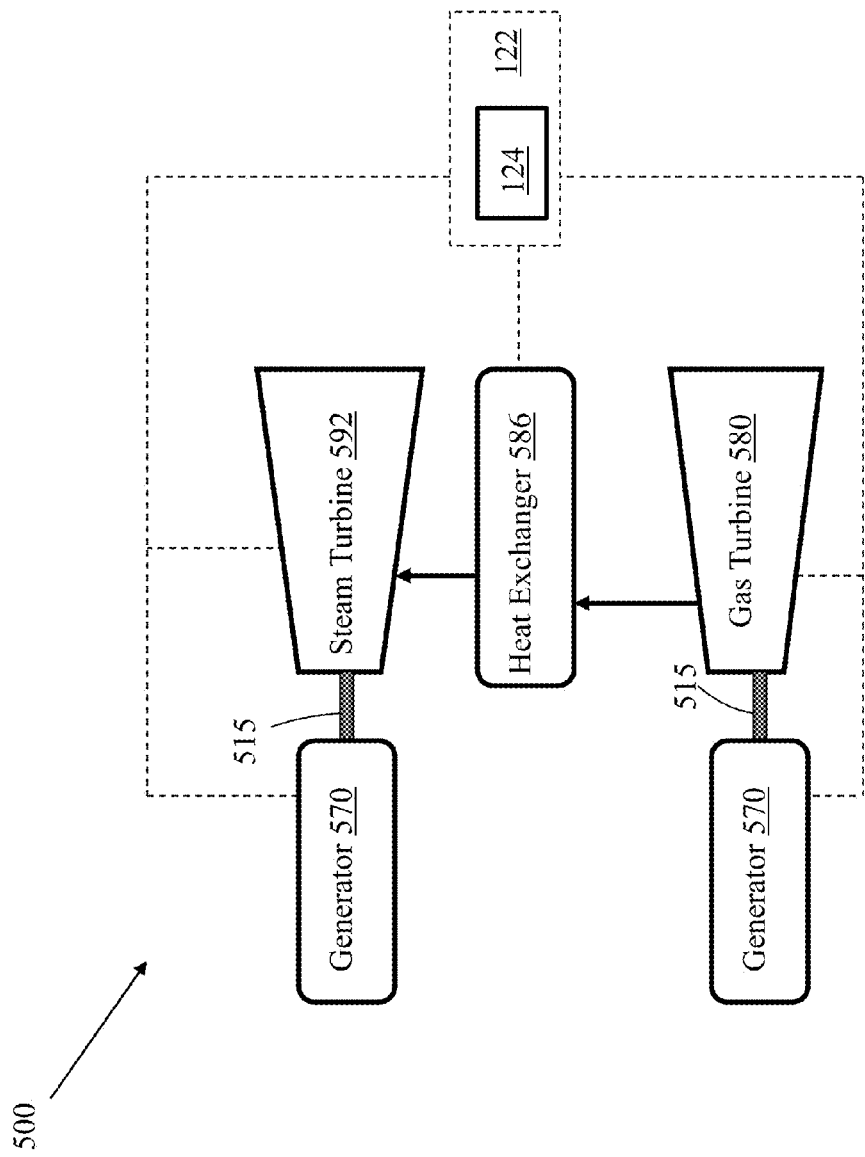
FIG. 9 shows a schematic view of portions of a multi-shaft combined cycle power plant in accordance with an embodiment of the invention.
Figure 10:
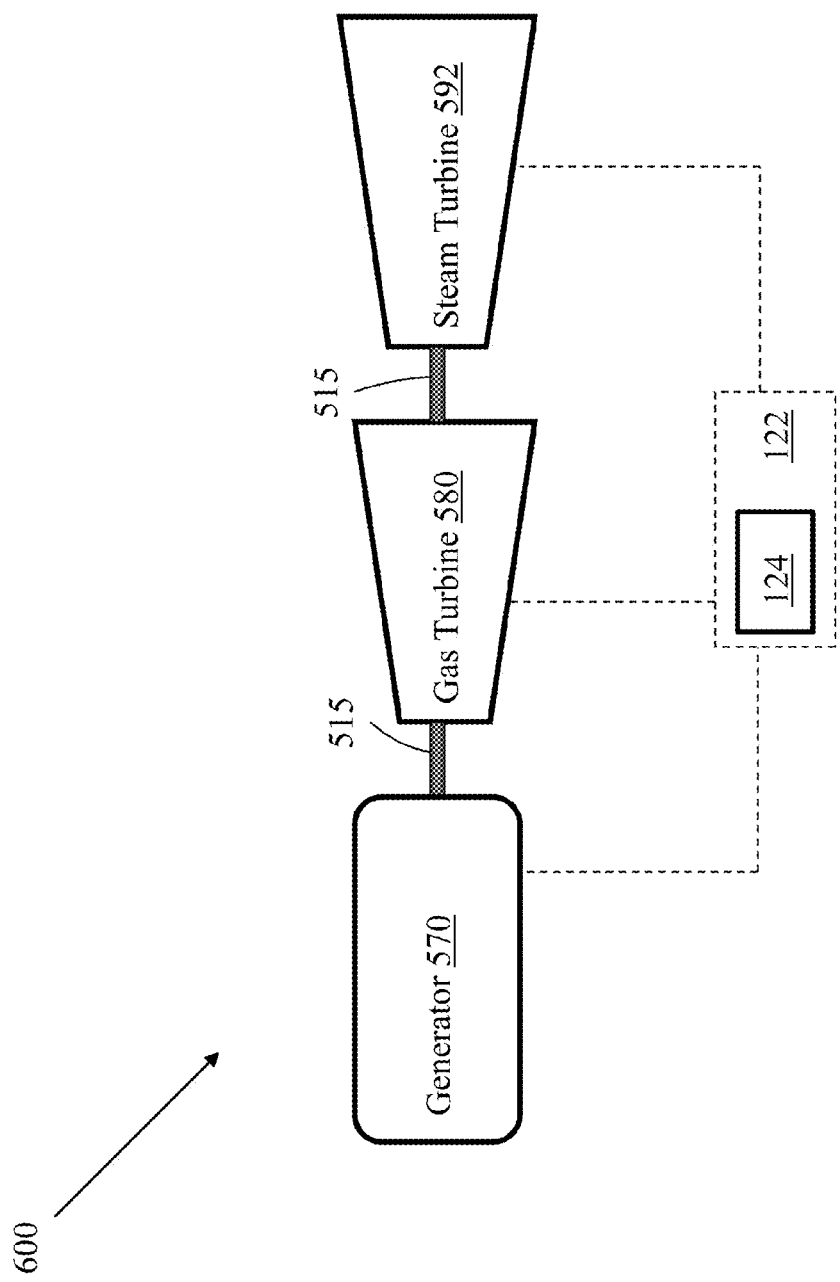
FIG. 10 shows a schematic view of portions of a single-shaft combined cycle power plant in accordance with an embodiment of the invention.

Turning to FIG. 9, a schematic view of portions of a multishaft combined-cycle power plant 500 is shown. Combined-cycle power plant 500 may include, for example, a gas turbine 580 operably connected to a generator 570. Generator 570 and gas turbine 580 may be mechanically coupled by a shaft 515, which may transfer energy between a gas turbine 580 and generator 570. Also shown in FIG. 9 is a heat exchanger 586 operably connected to gas turbine 580 and a steam turbine 592. Heat exchanger 586 may be fluidly connected to both gas turbine 580 and steam turbine 592 via conventional conduits (numbering omitted). Heat exchanger 586 may be a conventional heat recovery steam generator (HRSG), such as those used in conventional combined-cycle power systems. As is known in the art of power generation, HRSG 586 may use hot exhaust from gas turbine 580, combined with a water supply, to create steam which is fed to steam turbine 592. Steam turbine 592 may optionally be coupled to a second generator system 570 (via a second shaft 515). Any of generator system 570, gas turbine 580, HRSG 586, and steam turbine 592 may be operably connected to working fluid sensor system 124 via computing device 122 of FIG. 7 or other embodiments described herein. It is understood that generators 570 and shafts 515 may be of any size or type known in the art and may differ depending upon their application or the system to which they are connected. Common numbering of the generators and shafts is for clarity and does not necessarily suggest these generators or shafts are identical. Generator system 570 and second shaft 515 may operate substantially similarly to generator system 570 and shaft 515 described above. In one embodiment of the present invention (shown in phantom), working fluid sensor system 124 may be used, via computing device 122 to monitor steam turbine 592. In another embodiment, shown in FIG. 10, a single-shaft combined-cycle power plant 600 may include a single generator 570 coupled to both gas turbine 580 and steam turbine 592 via a single shaft 515. Gas turbine 580 and steam turbine 592 may be operably connected to working fluid sensor system 124 via computing device 122 of FIG. 7 or other embodiments described herein.

The working fluid sensor system of the present disclosure is not limited to any one power generation system, combined cycle power generation system, turbine or other system, and may be used with other power systems. Additionally, the system of the present invention may be used with other systems not described herein that may benefit from the operational analysis provided by the working fluid sensor system described herein.

As discussed herein, various systems and components are described as "obtaining" and/or "transferring" data (e.g., operational data, component temperatures, system specifications, etc.). It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
at least one computing device adapted to determine an operational characteristic of a turbine by performing actions comprising:

obtaining flow data from a set of sensors exposed to a flow of a working fluid in the turbine, the flow data including: a force imparted against one of the set of sensors, a fluid velocity, and a fluid density;

determining a moisture content of the working fluid based upon a predetermined relationship between the moisture content and a drag coefficient of the working fluid, the drag coefficient of the working fluid being determined from the flow data obtained from the set of sensors; and determining an operational characteristic for the turbine based on the moisture content of the working fluid.

2. A combined cycle power generation system comprising:

a gas turbine;

a heat recovery steam generator (HRSG) operatively connected to the gas turbine;

a steam turbine operatively connected to the HRSG;

a generator operatively connected to at least one of the gas turbine or the steam turbine;

a set of sensors exposed to a flow of working fluid in the steam turbine; and a computing device adapted to determine an operational characteristic of a turbine by performing actions including:

obtaining flow data from a set of sensors exposed to a flow of a working fluid in the turbine, the flow data including: a force imparted against one of the set of sensors, a fluid velocity, and a fluid density;

determining a moisture content of the working fluid based upon a predetermined relationship between the moisture content and a drag coefficient of the working fluid, the drag coefficient of the working fluid being determined from the flow data obtained from the set of sensors; and determining an operational characteristic for the turbine based on the moisture content of the working fluid.

3. The combined cycle power generation system of claim 2, wherein the set of sensors are adapted to be exposed to the working fluid for a predetermined period of time.

4. The combined cycle power generation system of claim 2, further comprising: a load cell connected to one of the set of sensors and configured to measure the force exerted on the one of the set of sensors by the working fluid, wherein the computing device is further configured to process measured force values obtained from the load cell and the flow data obtained from the set of sensors to determine the drag coefficient of the probe portions in the working fluid.

5. The combined cycle power generation system of claim 4, wherein the flow data of the computing device is further configured to determine at least one of an operational characteristic of the steam turbine or an efficiency of the turbine based on the drag coefficient.

6. The combined cycle power generation system of claim 2, wherein the set of sensors traverse the flowpath of the steam turbine.

7. The combined cycle power generation system of claim 2, wherein the set of sensors comprises four sensors disposed about equidistantly around a circumference of the flowpath.

8. The combined cycle power generation system of claim 2, wherein the computing device is further configured to determine at least one of an operational characteristic of the steam turbine or an efficiency of the turbine based on the indicated moisture content.

9. The combined cycle power generation system of claim 2, wherein the set of sensors are disposed in an exhaust portion of a turbine.

\* \* \* \* \*